United States Patent [19]
Brotz

[11] Patent Number: 5,382,233
[45] Date of Patent: Jan. 17, 1995

[54] METHOD OF ART INSTRUCTION

[76] Inventor: Gregory R. Brotz, P.O. Box 1322, Sheboygan, Wis. 53081

[21] Appl. No.: 132,797

[22] Filed: Oct. 7, 1993

Related U.S. Application Data

[63] Continuation-in-part of Ser. No. 909,674, Jul. 7, 1992, Pat. No. 5,252,073.

[51] Int. Cl.6 .................................... G09B 11/00
[52] U.S. Cl. .............................. 604/88; 604/81; 604/84
[58] Field of Search ................ 434/84, 88, 81, 85, 434/87

[56] References Cited

U.S. PATENT DOCUMENTS

| | | | |
|---|---|---|---|
| 1,559,665 | 11/1925 | Beery et al. | 434/88 |
| 3,492,743 | 2/1970 | Schmidt | 434/88 |
| 3,680,224 | 8/1972 | Hall . | |
| 4,340,372 | 7/1982 | Brassine | 434/88 |
| 4,457,717 | 7/1984 | Chika | 434/88 |
| 4,604,062 | 8/1986 | Woods | 434/88 |
| 4,912,849 | 4/1990 | MacCarthy | 434/88 |
| 5,228,858 | 7/1993 | Fromm | 434/88 |
| 5,252,073 | 10/1993 | Brotz | 434/84 |

Primary Examiner—Paul J. Hirsch
Attorney, Agent, or Firm—William Nitkin

[57] ABSTRACT

A method for teaching artistic methods and techniques by providing images on a television screen and providing means for copying such images by painting and methods for transferring the painted image to a sheet of material for display purposes.

6 Claims, 4 Drawing Sheets

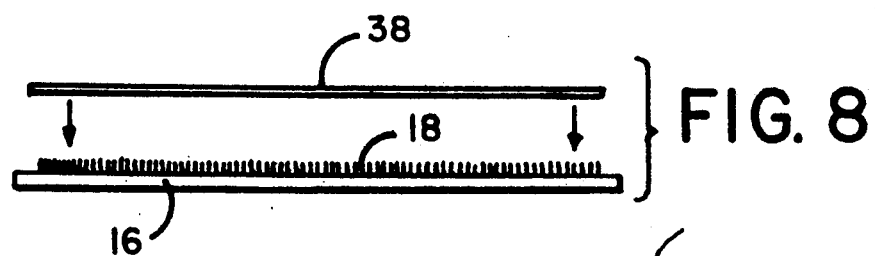
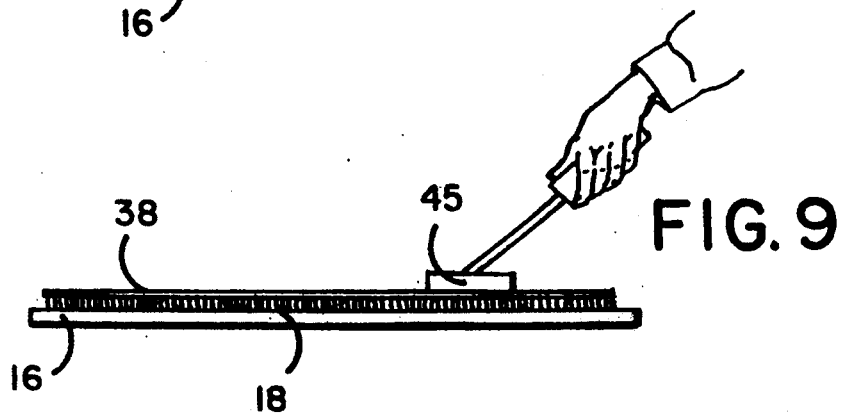
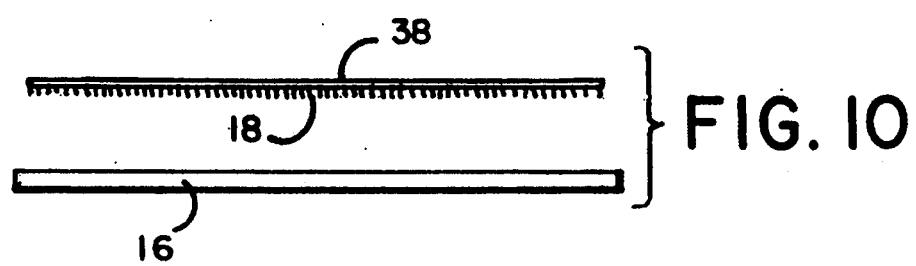
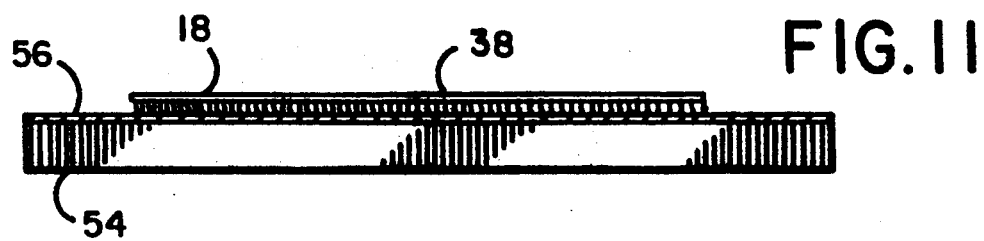
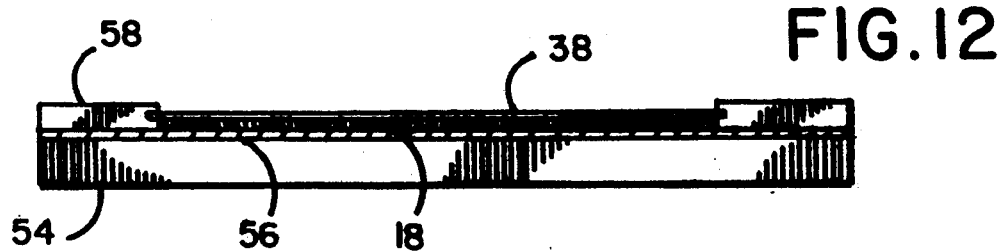

METHOD OF ART INSTRUCTION

This application is a continuation-in-part of my previous application under the title of System of Art Instruction, Ser. No. 07/909,674 filed Jul. 7, 1992, now U.S. Pat. No. 5,252,073.

BACKGROUND OF THE INVENTION

1. Field of the Invention

This invention relates to a method for teaching artistic methods and techniques and more particularly relates to a method of providing art instruction using the medium of television.

2. Description of the Prior Art

Various means and devices have been utilized in the prior art to enable one to duplicate a pattern or design such as the use of tracing paper, pantographs and the use of projection equipment.

SUMMARY OF THE INVENTION

It is an object of this invention to provide further embodiments of my system for teaching drawing and painting techniques to art students by providing images on a television screen to be copied by painting directly on the television screen and then removing such painted image from the television screen after completion. It should be understood that in the context of this application the "painting" of an image also includes within its meaning the drawing of an image with any media. In another embodiment one can place over such television screen a sheet of clear or translucent material upon which the student can duplicate by tracing or painting the image below as seen through such sheet which sheet can be thin glass or a heat shrunk plastic sheet shaped to fit the curvature of the television screen by heating means prior to painting or drawing on it. After the image on the screen has been copied onto the sheet, the painted image on the sheet can be adhered to a second sheet by pressure and/or heat means. In some embodiments instructional information can be provided in one section of the screen.

BRIEF DESCRIPTION OF THE DRAWINGS

FIG. 8 illustrates a cross-sectional side view through a television screen with painted image thereon with transfer sheet about to be positioned thereon.

FIG. 9 illustrates a cross-sectional side view through the television screen of FIG. 8 with the transfer sheet thereon being adhered to the painted image by a heat iron.

FIG. 10 illustrates a cross-sectional side view through the television screen of FIG. 9 showing the transfer sheet removed with the painted image adhered thereto.

FIG. 11 illustrates a cross-sectional side view through the transfer sheet with image thereon adhered to an adhesive-faced posterr board.

FIG. 12 illustrates a cross-sectional side view of the embodiment of FIG. 11 with a mat positioned therearound for display purposes.

DESCRIPTION OF THE PREFERRED EMBODIMENT(S)

Figure 1:
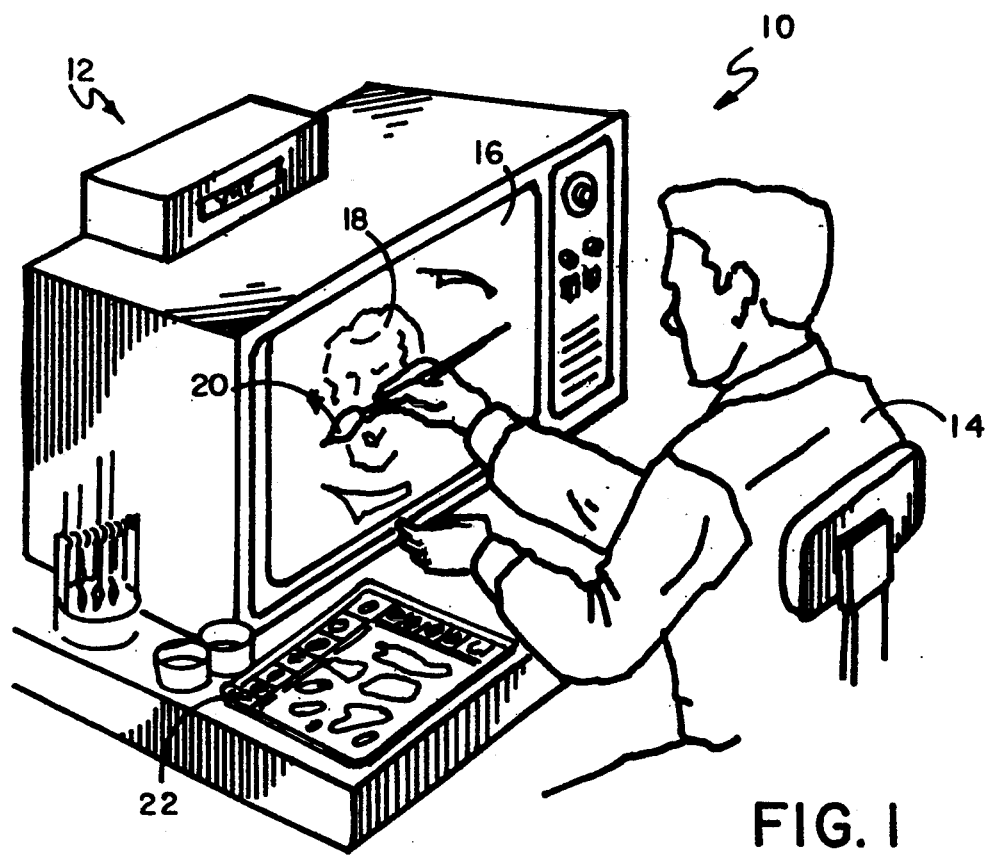
FIG. 1 illustrates a student utilizing the method of this invention.
Figure 2:
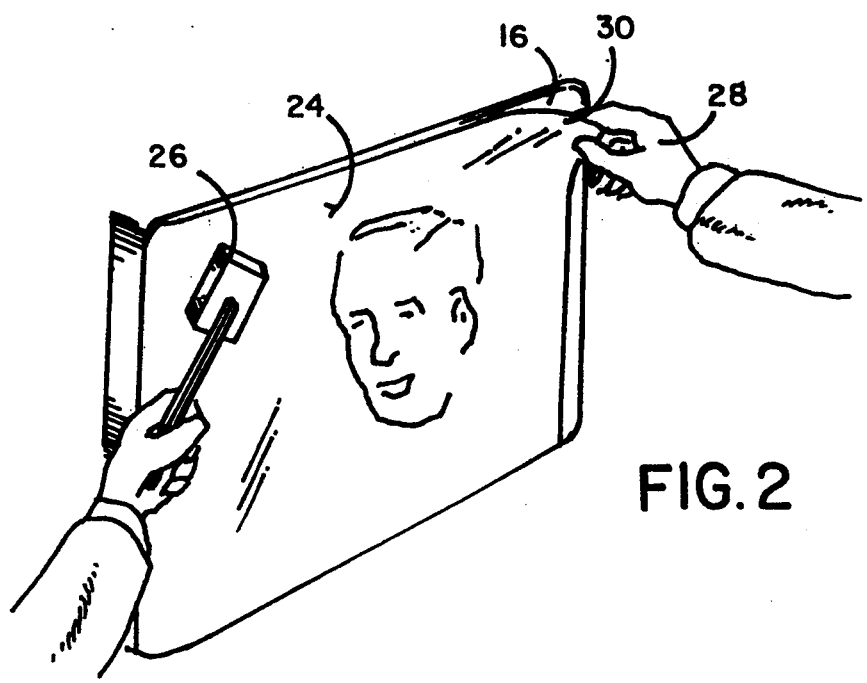
FIG. 2 illustrates a first sheet being placed on a television screen.
Figure 5:
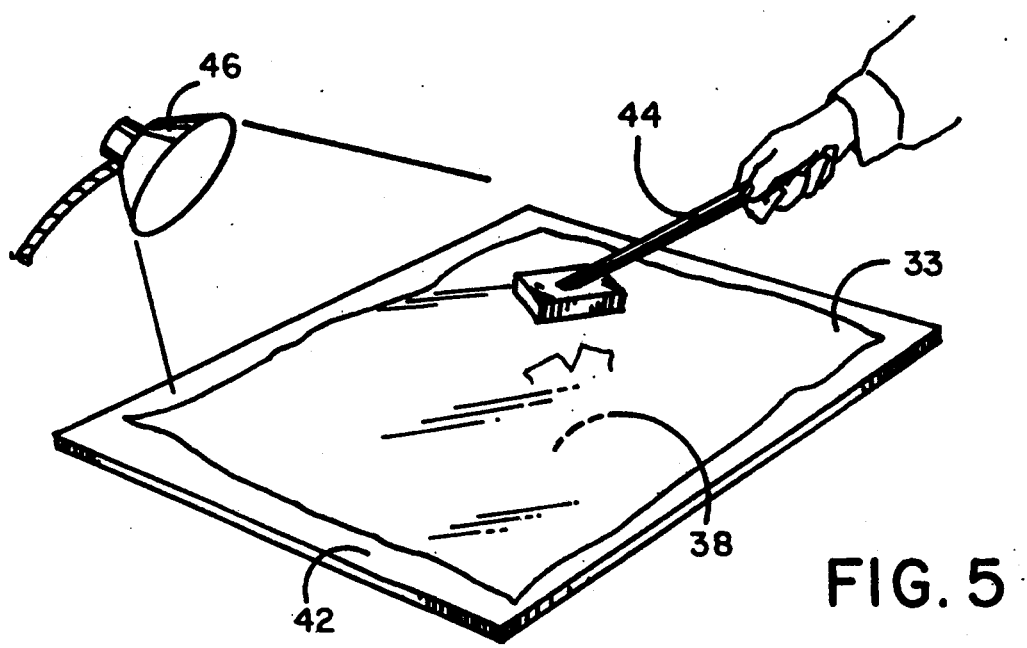
FIG. 5 illustrates the transfer of the painted image from a first sheet to a second sheet by contact with heat and/or pressure and the curing of such image by light.

FIG. 1 illustrates an art student 14 before a television set 10 on the screen of which is displayed an image 18 to be copied, such image either broadcast over the air, supplied by cable or provided from a video tape on a VCR 12. The television screen can be any type of flat panel video display and can be disposed vertically as shown, horizontally or at any angle therebetween for a student to comfortably observe the screen and paint on it. After the student has painted the image directly on the television screen, a transparent sheet 24 of material, as seen in FIG. 2, is placed over the painted image 18 and heated and/or pressured by hand-held heater 26 to transfer the painted image from the television screen 16 to sheet 24. The heat causes the paint to adhere to sheet 24 and after heating the paint adheres more strongly to sheet 24 which has a rough surface than to the surface of screen 16 which is smooth. Sheet 24 can be peeled off by hand 28, as seen in FIG. 2, starting such peeling at sheet corner 30 until the entire sheet 24 is removed with the painted image and transferred from the rear thereof, thereby pulling the painted or drawn image off television screen 16. A portion of the screen, not shown, could have an art teacher give verbal instructions or demonstrations of technique concerning the image on the screen which image and technique the student can try to duplicate. By having the teacher give instructions at the same time that the student practices copying the image with paints such as watercolors or tempera, the student can better learn the techniques being taught. To display image 18, now adhered to the rear of sheet 24, sheet 24 and the image thereon can be adhered to an adhesive-coated poster board such as board 54 as seen in FIG. 11. As seen in FIG. 5 ultraviolet light 46 can then be used to harden the paint after such a sheet has been adhered to a board with the painted image 38 visible through the top of the sheet in some instances.

FIGS. 8–12 illustrates cross-sectional side views of the process with transparent sheet 38 placed over both television screen 16 and painted image 18 in FIG. 8. In FIG. 9 sheet 38 is bonded to painted image 18 by heat and pressure from iron 45. Sheet 38 is lifted away from television screen 16 In FIG. 10, carrying-with it painted image 18. In FIG. 11 sheet 38 is placed on board 54 having a coating of adhesive 56 and a mat 58 is placed therearound in FIG. 12 for display of such painted image visible through sheet 38.

Figure 3:
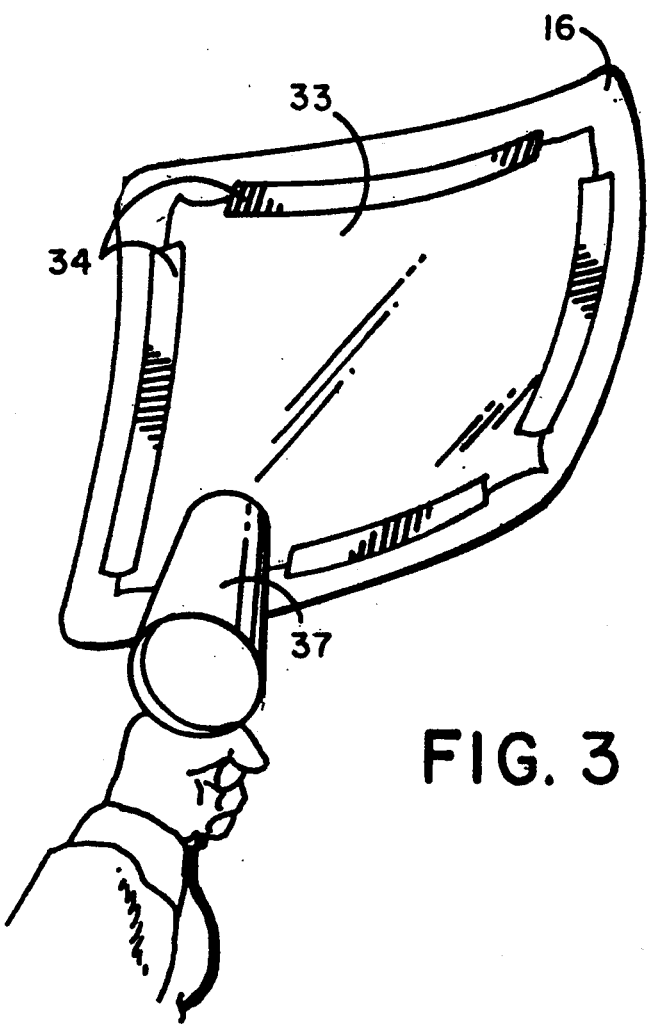
FIG. 3 illustrates a sheet of heat-shrinkable plastic being heated to cause such sheet to conform to the curvatures of a television screen.
Figure 4:
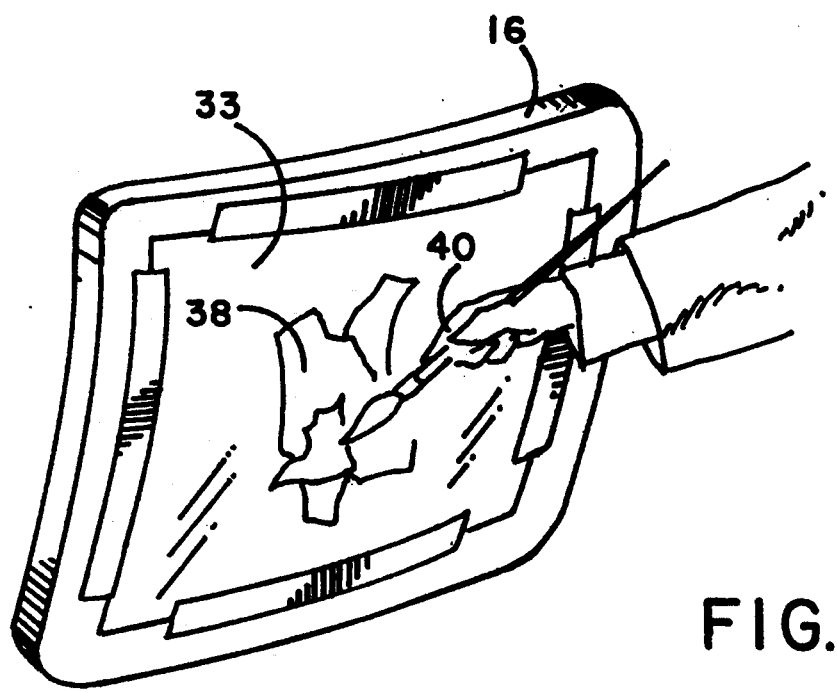
FIG. 4 illustrates a student painting on the sheet of FIG. 3.

In another embodiment a sheet of transparent material, such as discussed in my prior invention entitled System of Art Instruction, can first be positioned on the television screen prior to any painting or drawing thereon with the television image visible through such transparent material, such as illustrated in FIG. 3. To easily conform to the curved surface of a television screen, such material can take the form of a heat-shrinkable plastic material such as plastic shrinkwrap. In FIG. 3 heat-shrinkable, clear plastic sheet 33 is seen adhered to the edges of a television screen by tape 34. Heat from a heat source such as heat gun 37 is applied, causing the heat-shrinkable material to shrink and conform to the curvature of the screen. Many television screens are curved or slightly curved and as such the heat-shrinkable material 33, as seen in FIG. 4, once shrunk by heat, no longer has wrinkles therein and conforms nicely to the curvature of television screen 16. The student can then, as seen in FIG. 4, paint with brush 40 an image 38 onto the heat-shrinkable material 33. Then, as illustrated in FIG. 5, the heat-shrinkable sheet 33 can be removed and placed with its painted image face down on the surface of board 42. Image 38 can be bonded for display to board 42 by using heat and/or pressure from heat unit 44 and is visible through plastic sheet 33.

Figure 6:
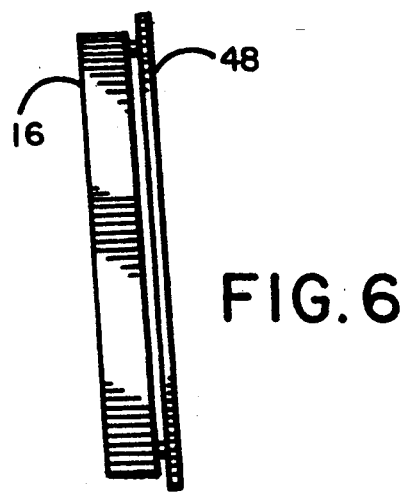
FIG. 6 illustrates a side view of a flat glass sheet positioned in front of a television screen.
Figure 7:
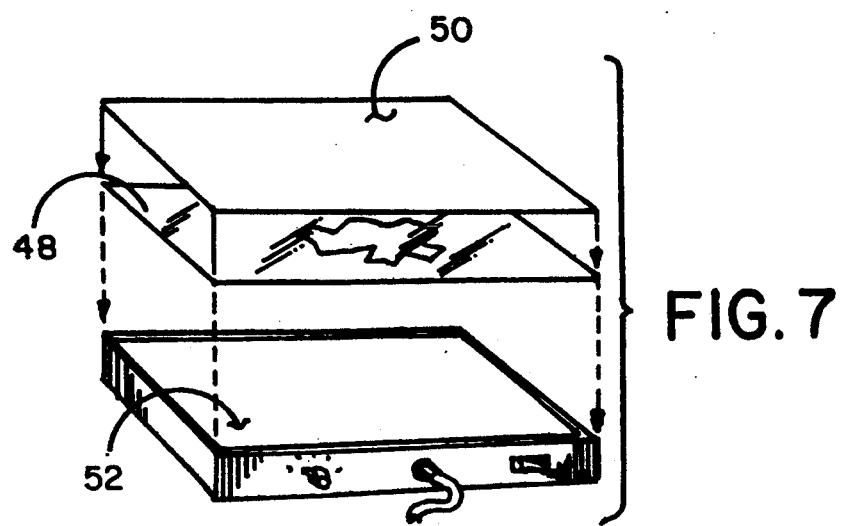
FIG. 7 illustrates a view of a glass sheet having a painted image thereon positioned over a heating plate, the glass sheet being aligned for covering such painted image.

In some embodiments it has been found that a thin sheet of glass can be placed over the television screen and can function as an intermediate sheet on which to practice artistic methods and techniques as well as the other types of sheets discussed above. FIG. 6 illustrates a side view of television screen 16 where the front of screen 16 has had a thin sheet of glass 48 adhered thereto such as by adhesive strips, velcro and the like so that it is removable. Later, as seen in FIG. 7, glass sheet 48 can be positioned with the image side up on hot plate 52 and a second clear sheet 50 can be positioned on top of the image on the glass and heated or otherwise pressured to cause a transfer of the painted image on glass sheet 48 to second clear sheet 50 for the display of the image. In some instances a contoured glass sheet could even be created to conform to the underlying curvature of the shape of the television screen. The contoured glass could also be used in a similar way for the transfer of the painted image thereon to a second clear sheet or directly onto an adhesive-coated board with the glass then removed for re-use. The transferred image can be sprayed with a fixative.

There are many combinations of materials and transfer methods that are suitable for the transfer of a painted or drawn image from the television screen directly or from an intermediate sheet placed over the screen to be painted thereon. Some of the possible combinations can include:

| Painting Material | Transfer Method |
| --- | --- |
| wax crayon and water | hot iron with paper |
| wax crayon and solvent | hot iron with paper |
| heat sensitive ink | hot iron with paper |
| wax and water | hot iron with plastic sheet |
| wax and solvent | hot iron with plastic sheet |
| heat sensitive ink | hot iron with plastic sheet |

Also pastel or grease sticks can be successfully used along with ink pens. Even sheets can be drawn on with charcoal and the image removed after a spray of fixative has been applied thereto. It has been found that watercolor or tempera paints can be effectively utilized when painted directly on the screen and then placing a sheet thereon that has a contact adhesive on the rear of such sheet. Tempera paint when drying on glass tends to enter a powdery state and when a sheet, for example, of transparent contact paper is placed with its adhesive side against the image and pressure is applied, such paint will then adhere to such transparent sheet more than to the television screen. As the sheet is pulled away manually from the screen, the painted image is removed from the screen and the painted image is left on the rear surface of the sheet. In some instances it may be helpful to spray a binder material on the painted image before it is removed which step will help hold it integrally together during the process of removal from the screen or from the sheet on which it has originally been painted. Some binders can include gum-type glues.

In cases where UV-curable paint is utilized, a UV light such as light 46 in FIG. 5 can be used once sheet 33 is removed, exposing the painted image after its positioning on board 42. Any UV radiant source can be utilized including putting the painting out in sunlight. In some cases the television tube's own radiation can cure a particular paint resin and certain television tubes can be adapted so as to produce UV radiation at the end of the painting process to cure the paint of the painted image thereon. Paint of different sensitivities relative to ultraviolet light curing can be used. In some instances the image of the painting can be checked by a painter if a channel is provided with just a white screen where the artist, if he turns to that channel, can utilize the bright white screen to shine through the paint that has been applied to better visualize what the painting looks like because the underlying television image is then removed and only the painted image can be seen. This same effect can be produced even when using a video camera televising an object to be shown on the screen or even televising a scenic view by merely placing a white piece of paper in front of the television camera which will then produce a white screen. The brightness can be gradually increased to shine through the painting. In some instances black backgrounds can be useful for checking progress, especially in looking at colors because in some instances the color of the artist's paint when mixed with the color of the television image can be somewhat deceptive as to the final color of the painted image. The use of luminescent paint can also be adapted for the method of this invention. In some instances paints can have glazing or transparent resin mixed in so that if there is a large buildup of paint on the surface of the television screen or on the sheet affixed to the screen, the television image can still be viewed through the large buildup of paint. Also such large paint buildup can be used to produce works with a three-dimensional quality which could then be mounted in a frame with backlighting to backlight the painted image. In this way an artist using the image information from the television screen also can adjust the thickness of the paint buildup and pigment concentrations in various areas which when backlit will produce an effective painted display that would not otherwise be available if painting on an opaque surface such as a canvas. If a clear layer of paint resin is first laid down, then by using various tools, one can work in pure pigments, powders or color concentrates. With such thick paints the use of UV-curable resins is most helpful since otherwise thick cross-sections of paint not exposed to air might take a long time to otherwise harden.

It should be noted that the television utilized with the method of this invention can have a brightness control so that the art student can adjust the television for a brightness setting suitable for copying the image on the screen. For example, if the art lesson concerned the proper layering of paint to create a desired image, increasing the brightness of the image on the television screen would allow the image of each subsequent layers of paint to be visible through a previous layer or layers of paint. The image could be changed also for each subsequent layer of paint to be applied. If a VCR is utilized, it should have enhancements which eliminate any lines running through a paused image on the television screen which lines would make such image difficult to duplicate on the screen.

The method of this invention is excellent for making animation cells from paused images of continuous action. One can also make videos, whether of scenery or action shots, and make artwork therefrom, selecting the best views and/or stop action images from which to make such artwork. Many techniques can be used, such as outlining an object on the sheet on the screen or other types of image simplification using fewer lines or features than are found in the original image.

Many computers have interactive screens which, when touched, sense the position of contact and react accordingly. Such computer screens can be used with this invention for interactive teaching where the instructor at a remote location can see what each student has painted by having such sensed contacts directed to such remote-location and displayed on a screen viewed by the instructor. In this way the instructor can critique the student's work as the student is working and broadcast such comments back over the student's television.

It is felt that using the method of this invention will provide an art student with hands-on experience while benefitting from professional instruction outside a classroom setting.

Although the present invention has been described with reference to particular embodiments, it will be apparent to those skilled in the art that variations and modifications can be substituted therefor without departing from the principles and spirit of the invention.

I claim:

1. A method for teaching artistic methods and techniques, comprising the steps of:
   providing a television set having a screen;
   providing a televised image on said screen of said television set;
   painting a copy of said televised image directly on said television screen directly over said televised image to form a painted image;
   providing a first sheet of transparent material having a front surface and a back surface;
   positioning said back surface of said first sheet of material over said painted image on said television screen;
   adhering said painted image on said television screen to said back surface of said first sheet of material with stronger adhesion than the adhesion of said painted image to said television screen; and
   removing said first sheet of material and pulling said painted image from said television screen for viewing said painted image on said first sheet of material.

2. The method of claim 1 further including the steps of:
   providing a second sheet of material having a front surface and a back surface; and
   positioning and adhering said first sheet of material carrying said painted image onto said front surface of said second sheet for display.

3. The method of claim 1 further including the step of illuminating said first sheet from the rear to display the painted image thereon.

4. A method for teaching artistic methods and techniques, comprising the steps of:
   providing a television set having a screen with a curved shade;
   providing a televised image on said screen of said television;
   positioning a first sheet of transparent material having a front surface and a back surface with said back surface on said screen;
   shaping said first sheet of transparent material to conform to said curved shape of said screen;
   painting a copy of said televised image on said front surface of said first sheet of transparent material;
   removing said first sheet of transparent material; and
   providing a second sheet of material having a front surface and a back surface; and
   adhering said first sheet with said painted image against said front surface of said second sheet for display.

5. The method of claim 4 wherein said first sheet of transparent material is a sheet of glass.

6. The method of claim 5 wherein said first sheet of transparent material is a heat-shrinkable plastic and said step of shaping said first sheet further includes the step of heating said heat-shrinkable plastic material to conform to said curved shape of said television screen.

* * * * *

UNITED STATES PATENT AND TRADEMARK OFFICE
CERTIFICATE OF CORRECTION

PATENT NO. : 5,382,233
DATED : 01/17/95
INVENTOR(S) : Gregory R. Brotz

It is certified that error appears in the above-identified patent and that said Letters Patent is hereby corrected as shown below:

Column 6: Claim 4, line 4 by deleting "shade" and substituting therefor --shape--.

Signed and Sealed this

Eleventh Day of July, 1995

Attest:

BRUCE LEHMAN

Attesting Officer     Commissioner of Patents and Trademarks